United States Patent
Liu

(10) Patent No.: US 12,237,869 B2
(45) Date of Patent: Feb. 25, 2025

(54) OPTICAL COMMUNICATION TRANSMITTING DEVICE, OPTICAL COMMUNICATION RECEIVING DEVICE, METHOD AND SYSTEM

(71) Applicants: Beijing BOE Technology Development Co., Ltd., Beijing (CN); BOE Technology Group Co., Ltd., Beijing (CN)

(72) Inventor: Kairan Liu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 377 days.

(21) Appl. No.: 17/636,155

(22) PCT Filed: Mar. 16, 2021

(86) PCT No.: PCT/CN2021/081075
§ 371 (c)(1),
(2) Date: Feb. 17, 2022

(87) PCT Pub. No.: WO2021/185246
PCT Pub. Date: Sep. 23, 2021

(65) Prior Publication Data
US 2022/0294532 A1    Sep. 15, 2022

(30) Foreign Application Priority Data

Mar. 17, 2020 (CN) .......................... 202010188295.5

(51) Int. Cl.
*H04B 10/50* (2013.01)
*H04B 10/116* (2013.01)

(52) U.S. Cl.
CPC ......... *H04B 10/502* (2013.01); *H04B 10/116* (2013.01)

(58) Field of Classification Search
CPC .. H04B 10/502; H04B 10/116; H04B 10/501; H04B 10/516; H04B 10/532; G09G 3/36;
(Continued)

(56) References Cited

U.S. PATENT DOCUMENTS

2009/0322766 A1* 12/2009 Marien ................ G06F 21/606
345/520
2018/0164622 A1   6/2018 Ono
(Continued)

FOREIGN PATENT DOCUMENTS

CN   102169271 A   8/2011
CN   103778898 A   5/2014
(Continued)

OTHER PUBLICATIONS

CN 202010188295.5 first office action.
PCT/CN2021/081075 international search report and written opinion.

*Primary Examiner* — Hibret A Woldekidan
(74) *Attorney, Agent, or Firm* — IPro, PLLC

(57) ABSTRACT

An optical communication transmitting device, an optical communication receiving device, a method, and a system are provided. The optical communication transmitting device includes: a light-emitting display screen, a liquid crystal panel, and a control circuit; the liquid crystal panel is located at a light emission side of the light-emitting display screen; the control circuit is configured to generate, according to a presetting encoding rule, a driving voltage that controls liquid crystal molecules of the liquid crystal panel to be twisted, and the presetting encoding rule is related to a target deflection angle, wherein a polarized light beam emitted from the light-emitting display screen passes through the (Continued)

liquid crystal panel driven by the driving voltage, and then is deflected according to the target deflection angle, and then is transmitted to an optical communication receiving device.

16 Claims, 3 Drawing Sheets

(58) Field of Classification Search
CPC . G09G 3/3607; G06F 21/606; G03H 2240/15
See application file for complete search history.

(56) References Cited

U.S. PATENT DOCUMENTS

| | | | |
|---|---|---|---|
| 2018/0249085 A1* | 8/2018 | Ozawa | H04N 13/296 |
| 2018/0286321 A1* | 10/2018 | Gao | G09G 3/3406 |
| 2019/0164508 A1* | 5/2019 | Miller | G09G 3/36 |
| 2020/0153505 A1 | 5/2020 | Li | |
| 2021/0390396 A1* | 12/2021 | Fan | G06N 3/08 |

FOREIGN PATENT DOCUMENTS

| | | | | |
|---|---|---|---|---|
| CN | 105551417 A | | 5/2016 | |
| CN | 109361457 A | * | 2/2019 | H04B 10/116 |
| CN | 209748565 U | | 12/2019 | |
| CN | 111262628 A | | 6/2020 | |
| JP | H0364732 A | * | 3/1991 | G02F 1/13 |

\* cited by examiner

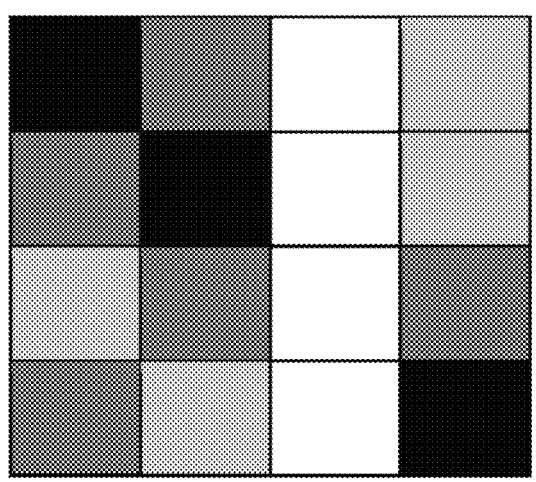
Fig. 3
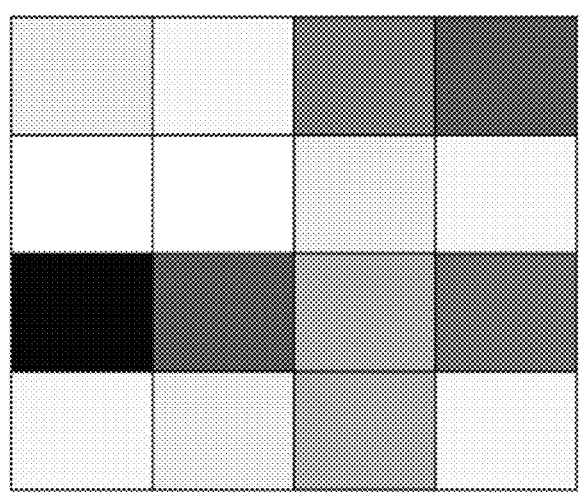
Fig. 4
Fig. 5A

| grayscale reduced by 80 | grayscale reduced by 50 | grayscale reduced by 150 | grayscale increased by 80 |
|---|---|---|---|
| grayscale reduced by 50 | grayscale reduced by 200 | grayscale increased by 50 | grayscale reduced by 80 |
| grayscale increased by 100 | grayscale increased by 50 | grayscale increased by 80 | grayscale reduced by 20 |
| grayscale reduced by 110 | grayscale reduced by 20 | grayscale increased by 80 | grayscale reduced by 80 |

Fig. 5B

| 0 | 0 | 0 | 1 |
|---|---|---|---|
| 0 | 0 | 1 | 0 |
| 1 | 1 | 1 | 0 |
| 0 | 0 | 1 | 0 |

Fig. 6

OPTICAL COMMUNICATION TRANSMITTING DEVICE, OPTICAL COMMUNICATION RECEIVING DEVICE, METHOD AND SYSTEM

CROSS-REFERENCE TO RELATED APPLICATION

This application is the U.S. national phase of PCT Application No. PCT/CN2021/081075 filed on Mar. 16, 2021, which claims priority of Chinese Patent Application No. 202010188295.5 filed in China on Mar. 17, 2020, the entire contents of which are incorporated herein by reference.

TECHNICAL FIELD

The present disclosure relates to the field of optical communication technology, and particularly to an optical communication transmitting device, an optical communication receiving device, a method, and a system.

BACKGROUND

Visible light communication technology is an emerging wireless optical communication technology that uses high-speed twinkling signals that are invisible to naked eyes and emitted from a light emitting device such as a fluorescent lamp or a light-emitting diode to transmit information, and receives optical signals through photoelectric elements and converts the optical signals into electrical signals, so as to achieve the reception and transmission of the signal. The visible light communication technology has the characteristics of wide range, practicality, confidentiality, high speed and wide frequency spectrum, which can fill the blind spots of current wireless communication. As long as there is light, communication can be realized, and it can be applied in a variety of fields. The current solution combining the display panel and the optical communication can realize the optical communication, but it adversely affects the service life of the backlight.

SUMMARY

A first aspect of the present disclosure provides an optical communication transmitting device, including: a light-emitting display screen, a liquid crystal panel, and a control circuit;
the liquid crystal panel is located at a light emission side of the light-emitting display screen;
the control circuit is configured to generate, according to a presetting encoding rule, a driving voltage that controls liquid crystal molecules of the liquid crystal panel to be twisted, and the presetting encoding rule is related to a target deflection angle,
wherein a polarized light beam emitted from the light-emitting display screen passes through the liquid crystal panel driven by the driving voltage, and then is deflected according to the target deflection angle, and then is transmitted to an optical communication receiving device.

Optionally, the control circuit is further configured to: update the encoding rule according to a screen refresh period of the light-emitting display screen.

Optionally, wherein the control circuit is further configured to:
update the encoding rule according to a screen refresh period of the light-emitting display screen.

Optionally, the light-emitting display screen and the liquid crystal panel are driven independently.

Optionally, polarization directions of the polarized light beams emitted respectively by one or more pixels of the light-emitting display screen are same, the one or more pixels of the light-emitting display screen correspond to the encoding region;
when there are two or more than two encoding regions, the polarization directions of the polarized light beams emitted respectively by the one or more pixels of the light-emitting display screen corresponding to any one of the encoding regions are independent of the polarization directions of the polarized light beams emitted respectively by the one or more pixels of the light-emitting display screen corresponding to any other one of the encoding regions, and the control circuit is configured to control the driving voltages of the liquid crystals in the encoding regions.

A second aspect of the present disclosure provides an optical communication receiving device, including:
an optical signal receiving unit, configured to receive, through a polarizing device, a polarized light beam emitted from a light-emitting display screen being not deflected, to obtain a second image, and receive, through the polarizing device, a polarized light beam emitted from the light-emitting display screen being deflected according to a target deflection angle, to obtain a first image, wherein each of the second image and the first image includes at least one decoding region corresponding to a respective encoding region;
a decoding unit, configured to parse the first image and the second image according to a presetting decoding rule, and obtain a code stream, wherein the decoding rule is related to a magnitude of a grayscale variation of an image.

Optionally, the decoding unit includes:
a grayscale-variation-image obtaining subunit, configured to obtain, according to the first image and the second image, a grayscale variation image of the first image relative to the second image, wherein each decoding region of the grayscale variation image has a grayscale variation value;
a grayscale threshold setting subunit, configured to set a grayscale threshold;
a code stream generation subunit, configured to obtain, according to the grayscale variation value of each decoding region of the grayscale variation image and the grayscale threshold, codes of all or part of the decoding regions of the grayscale variation image, and generate a code stream.

Optionally, the code stream generation subunit includes:
a decoding rule generation subunit, configured to decode the decoding region to be 1 when the grayscale variation value of the decoding region is greater than the grayscale threshold, and decode the decoding region to be 0 when the grayscale variation value of the decoding region is less than the grayscale threshold.

Optionally, wherein a transmission axis of the polarizing device is configured to be adjustable.

A third aspect of the present disclosure provides an optical communication system, including:
the optical communication transmitting device as described above; and
the optical communication receiving device as described above.

A fourth aspect of the present disclosure provides a method for implementing optical communication, wherein the method is operable by an optical communication transmitting device including a light-emitting display screen, a liquid crystal panel, and a control circuit; the liquid crystal panel is located at a light emission side of the light-emitting display screen; and the method includes:

generating, according to a presetting encoding rule, a driving voltage that controls liquid crystal molecules of the liquid crystal panel to be twisted, and the presetting encoding rule is related to a target deflection angle, wherein a polarized light beam emitted from the light-emitting display screen passes through the liquid crystal panel driven by the driving voltage, and then is deflected according to the target deflection angle, and then is transmitted to an optical communication receiving device.

Optionally, the liquid crystal panel includes at least one encoding region, and the encoding region corresponds to one or more pixels of the light-emitting display screen.

Optionally, the method further includes: updating the encoding rule according to a screen refresh period of the light-emitting display screen.

Optionally, the method further including: independently driving the light-emitting display screen and the liquid crystal panel.

Optionally, polarization directions of the polarized light beams emitted respectively by one or more pixels of the light-emitting display screen are same, the one or more pixels of the light-emitting display screen correspond to the encoding region;

when there are more than two encoding regions, the polarization directions of the polarized light beams emitted respectively by the one or more pixels of the light-emitting display screen corresponding to any one of the encoding regions are independent of the polarization directions of the polarized light beams emitted respectively by the one or more pixels of the light-emitting display screen corresponding to any other one of the encoding regions, and the control circuit is configured to control the driving voltages of the liquid crystals in the encoding regions.

A fifth aspect of the present disclosure provides a method for implementing optical communication, operable by an optical communication receiving device, including:

receiving, through a polarizing device, a polarized light beam emitted from a light-emitting display screen being not deflected, to obtain a second image, and receiving, through the polarizing device, a polarized light beam emitted from the light-emitting display screen being deflected according to a target deflection angle, to obtain a first image, wherein each of the second image and the first image includes at least one decoding region corresponding to a respective encoding region;

parsing the first image and the second image according to a presetting decoding rule, and obtaining a code stream, and the decoding rule being related to a magnitude of a grayscale variation of an image.

Optionally, parsing the first image and the second image according to the presetting decoding rule, and obtaining the code stream, and the decoding rule being related to the magnitude of the grayscale variation of the image, includes:

obtaining, according to the first image and the second image, a grayscale variation image of the first image relative to the second image, wherein each decoding region of the grayscale variation image has a grayscale variation value;

setting a grayscale threshold;

obtaining, according to the grayscale variation value of each decoding region of the grayscale variation image and the grayscale threshold, codes of all or part of the decoding regions of the grayscale variation image, and generating a code stream.

Optionally, the decoding region is decoded to be 1 when the grayscale variation value of the decoding region is greater than the grayscale threshold, and the decoding region is decoded to be 0 when the grayscale variation value of the decoding region is less than the grayscale threshold.

Optionally, a transmission axis of the polarizing device is configured to be adjustable.

BRIEF DESCRIPTION OF THE DRAWINGS

In order to more clearly describe the technical solutions in one or more embodiments of the present disclosure or prior art, the following will briefly introduce the drawings that need to be used in the description of the embodiments or prior art. Obviously, the drawings in the following description are only one or more embodiments of the present disclosure. For a person skilled in the art, other drawings can be obtained based on these drawings without creative work.

FIG. 3 is a schematic diagram of the vibration angle polarized light beam after the deflection by the liquid crystal layer provided by an embodiment of the present disclosure;

FIG. 4 is a schematic diagram of a first image provided by an embodiment of the present disclosure;

FIG. 5A is a schematic diagram of a second image provided by an embodiment of the present disclosure;

FIG. 5B is a schematic diagram of a first image corresponding to a second image in FIG. 5A;

FIG. 6 is a schematic diagram of decoding obtained corresponding to FIG. 5B.

DETAILED DESCRIPTION

In order to make the objectives, technical solutions, and advantages of the present disclosure clearer, the present disclosure will be further described in detail as follows in conjunction with specific embodiments and with reference to the accompanying drawings.

It should be noted that, unless otherwise defined, any technical or scientific term used in one or more embodiments of the present disclosure shall have the common meaning understood by a person skilled in the art. Such words as "first" and "second" used in one or more embodiments of the present disclosure are merely used to differentiate different components rather than to represent any order, number or importance. Such word as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In a method for optical communication by using a display panel of related art, it mainly implements data transmission by flicker of backlight. When the backlight flickers at a high frequency, although it will not affect the display effect, the frequent flickering will reduce the service life of the backlight; when the backlight flickers at a relatively low frequency, it will not only affect the screen display, but also be harmful to the human eyes, especially the eyes of children.

Therefore, in a first aspect of the present disclosure, the inventor proposes an optical communication transmitting apparatus based on the characteristics that liquid crystals can change the polarization direction of light, so as to solve the problem in the related art where the service life of the backlight is shorten and the quality of the screen display is adversely affected due to the optical communication of the display panel.

Figure 1:
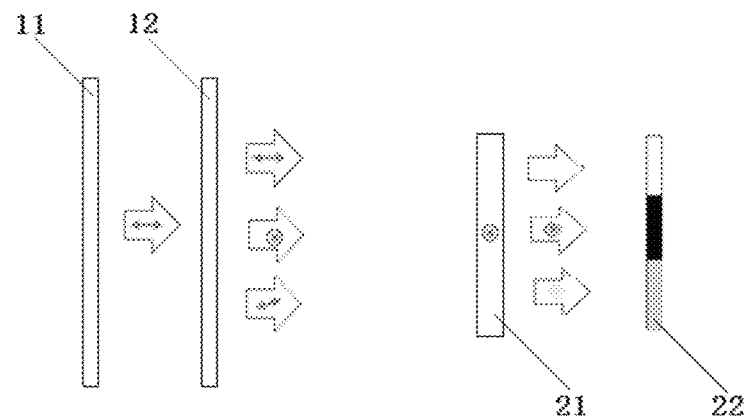
FIG. 1 is a structural schematic diagram of an optical communication system provided by an embodiment of the present disclosure.

As the left side of FIG. 1 shows, the optical communication transmitting device includes: a light-emitting display screen 11, a liquid crystal panel 12 and a control circuit (not shown), the liquid crystal panel 12 is located at a light emission side of the light-emitting display screen 11; the control circuit is configured to: generate a driving voltage that controls the liquid crystal molecules of the liquid crystal panel to be twisted according to a presetting encoding rule, the presetting encoding rule being related to a target deflection angle; after a polarized light beam emitted from the light-emitting display screen passes through the liquid crystal panel driven by the driving voltage, the polarized light beam is deflected according to the target deflection angle and transmitted to the optical communication receiving device.

The driving voltage applied to the liquid crystal panel is generated according to the following process: according to the encoding rules, the angle at which the liquid crystal molecules need to be deflected is determined; according to the angle at which the liquid crystal molecules need to be deflected, the deflection angel is converted into the driving voltage that needs to be applied to the liquid crystal molecules.

The liquid crystal panel includes at least one encoding region, and the encoding region corresponds to one or more pixels of the light-emitting display screen.

In the embodiments of the present disclosure, it assumes a light-emitting display screen with 4×4 pixels, and a liquid crystal panel with 4×4 encoding regions.

As an example, assuming that a encoding rule "1" corresponds to that liquid crystal molecules in the encoding region need to be deflected by 90°, and the encoding rule "0" corresponds to that liquid crystal molecules in the encoding region need to be deflected by 30°, and the encoding rule further stipulates that the encoding regions of the liquid crystal panel are encoded in the sequence that is from left to right and from top to bottom. If the first bit of the code stream is 1, and the second bit of the code stream is 0, the control circuit generates driving voltages to control the liquid crystal molecules in the first encoding region of the first row of the liquid crystal panel to deflect 90°, and to control the liquid crystal molecules in the second encoding region of the first row to deflect 30°, and so on, which will not be described in further detail herein.

It should be noted that the encoding rule may also define the position of the encoding region. For example, the encoding regions of the second row and the third row may be selected for encoding.

At the same time, the encoding regions of the liquid crystal panel being encoded in the sequence that is from left to right and from top to bottom is not limited. it should be appreciated that the encoding regions of the liquid crystal panel may be encoded in sequence that is from top to bottom and then from left to right, or from right to left and from top to bottom, and so on. The foregoing corresponding rule of 1, 0 and the polarization angles can also be adjusted. In fact, the specific encoding rule can be flexibly set according to requirements, as long as it conforms to a certain rule, and can be encoded and decoded appropriately.

The light-emitting display screen and the liquid crystal panel are driven independently.

The polarization directions of the polarized light beams emitted respectively by one or more pixels of the light-emitting display screen corresponding to the encoding region are the same; when there are more than two encoding regions, the polarization directions of the polarized light beams emitted respectively by one or more pixels of the light-emitting display screen corresponding to each of the encoding regions are independent, and the control circuit is configured to control the driving voltages of the liquid crystals in the encoding regions.

It can be seen from the above described embodiments that the optical communication transmitting device provided by the embodiment of the present disclosure, by arranging the liquid crystal panel on a light emission side of the light-emitting display screen, and using a control circuit according to a presetting encoding rule, to generate the driving voltage that controls the liquid crystal molecules of the liquid crystal panel to be twisted, wherein the presetting encoding rule is related to a target deflection angle; after the polarized light beam emitted from the light-emitting display screen passes through the liquid crystal panel driven by the driving voltage, the polarized light beam is deflected according to the target deflection angle and transmitted to the optical communication receiving device. Based on this method, the emitting of the optical communication signal does not require the flicker of the backlight, which will not adversely affect the service life of the backlight at all, and will not harm to the human eyes due to the flicker. In addition, because the liquid crystal layer does not change the color and brightness of the light beam, but only changes the polarization angle of the polarized light beam emitted from the light-emitting display screen, the original color and brightness can be maintained. In addition, the polarized light beams have multiple polarization directions, so as to ensure the display quality while obtaining display light beam that is closer to natural light, which has the effect of protecting eyes, and the entire optical communication transmitting device can realize eye-protecting display.

As an optional embodiment, the light-emitting display screen 11 may be a liquid crystal display with a backlight, a Light Emitting Diode (LED display), or the like.

Figure 2A:
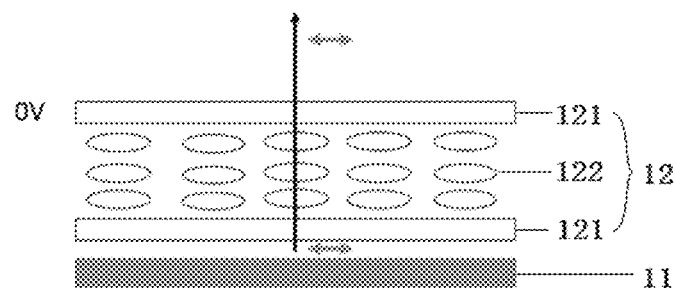
FIG. 2A is a state schematic diagram of the liquid crystal layer when no voltage provided by an embodiment of the present disclosure.
Figure 2B:
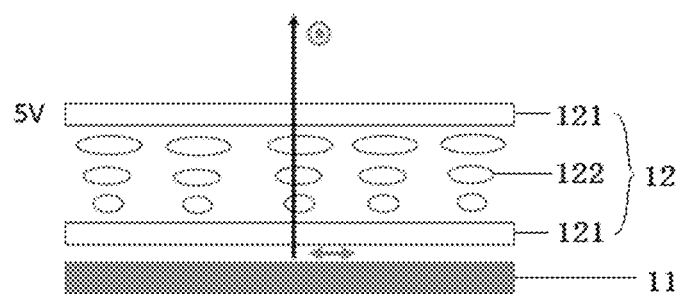
FIG. 2B is a state schematic diagram of the liquid crystal layer when there is voltage provided by an embodiment of the present disclosure.

As an optional embodiment, the liquid crystal panel 12 includes electrode layers 121 arranged at both sides and a liquid crystal layer 122 arranged between the electrode layers 121 (as shown in FIG. 2A and FIG. 2B). The electrode layers 121 apply a driving voltage to drive the deflection of the liquid crystal molecules in the liquid crystal layer 122 to deflect the polarized light beam from the light-emitting display screen, and then use the polarization angle of the polarized light beam to realize the emission of optical communication signals.

For example, the advanced super dimension switch (ADS) liquid crystals function based on the ADS technology, which may illustrate how the liquid crystal panel works. For example, when it is 0V, the liquid crystal molecules are distributed in parallel (as shown in FIG. 2A), when the polarized light beam emitted from the light-emitting display screen 11 passes through the liquid crystal panel 12, a vibration direction of the polarized light beam does not change; when it is 5V, the liquid crystal molecules are twisted, so that when the polarized light beam emitted from the light-emitting display screen 11 passes through the liquid crystal layer, the vibration direction thereof is deflected by 90° (as shown in FIG. 2B). In addition to the above extreme cases, changing the voltage applied to the liquid crystal layer at the intermediate voltage can cause them to be twisted at different degrees, i.e. can cause the vibration direction of the polarized light beam emitted from the light-emitting display screen to deflect at any angle, for example, when the applied voltage is 2V, the vibration direction of the polarized light beam emitted from the light-emitting display screen is deflected by 40° after passing through the liquid crystal panel 12.

Optionally, the electrode layer 121 is a transparent electrode layer. By arranging the transparent electrode layer, the polarized light beam emitted from the light-emitting display screen 11 can completely transmit through the transparent electrode layer. While ensuring the quality of the deflected polarized light beam, the overall display quality of the transmitting device is not adversely affected, which allows a user to view the display screen properly.

In the embodiment of the present disclosure, for the case in which each encoding region of a liquid crystal panel corresponds to a respective one pixel of a light-emitting display screen, an example is as follows: the light-emitting display screen is composed of 4×4 pixels, and the liquid crystal panel is composed of 4×4 encoding regions, the pixels of the light-emitting display screen correspond to the encoding regions of the liquid crystal panel respectively, therefore the light emitted from each pixel is transmitted after passing through the corresponding encoding region.

For the case in which each encoding region of a liquid crystal panel corresponds to respective multiple pixels of a light-emitting display screen, an example is as follows: the light-emitting display screen is composed of 4×4 pixels, and the liquid crystal panel is composed of 2×2 pixel units. Each encoding region of the liquid crystal panel on the optical path corresponds to respective 2×2 pixels of the light-emitting display screen. Therefore, the light emitted from every 2×2 pixels of the light-emitting display screen is transmitted after passing through the corresponding encoding regions of the liquid crystal panel.

As shown in FIG. 3, it is a schematic diagram of the vibration angles of the polarized light beam after being deflected by the liquid crystal panel. The liquid crystal panel corresponding to FIG. 3 is composed of 4×4 encoding regions. The polarization direction of each encoding region is independently controlled. Although the vibration directions of the polarized light beams emitted from the light-emitting display screen are the same, their vibration angles are deflected at different degrees after the polarized light beams passing through the encoding regions. The 30%, 50%, 70%, 100% shown in FIG. 3 are the light intensity proportions of the polarized light beams emitted from the light-emitting display screen deflected according to the target deflection angles in the direction parallel to the paper surface or in the direction perpendicular to the paper surface. Take the first 100% in the first row of FIG. 3 for example, it represents that the light intensity of the polarized light beam emitted from the first pixel in the first row of the light-emitting display screen is 100% of the original light intensity in the direction parallel to the paper surface after the polarized light beam is modulated by the liquid crystal panel.

When the grayscale of each pixel of the light-emitting display screen is the same, for example, the light-emitting display screen is in a pure white display, the polarized light beam emitted from each pixel of the light-emitting display screen is completely the same, so the difference of polarized light beams of the target polarization angles emitted from the transmitting device is caused by only the driving voltages. When the light-emitting display displays an image, the grayscale of each pixel is different, that is, the polarized light beam emitted from each pixel of the light-emitting display screen has a difference in brightness, so the difference of the polarized light beams of the target polarization angles emitted from the transmitting device is caused by not only the driving voltages, but also the polarized light beams themselves emitted from the light-emitting display screen. If the transmitting device only emits polarized light beam at a target polarization angle, it is difficult to determine the actual driving voltage. Therefore, the transmitting device needs to be able to directly emit the light of the light-emitting display screen without being deflected by the liquid crystal panel, so as to determine the driving voltage.

It should be noted that when the encoding is complicated, the encoding can be divided into multiple portions to be transmitted separately. In this case, the liquid crystal molecules in different encoding regions of the entire liquid crystal panel will be deflected differently based on time. Accordingly, the polarization direction of the polarized light beam emitted from the pixels of the light-emitting display screen corresponding to the encoding region of the liquid crystal panel will also change with time. The change of the polarized light beam direction of one pixel of the light-emitting display screen with time can be regarded as a channel. In a period of time, the change of the polarized light beam direction of all or part of the pixels of the entire light-emitting display screen can be recorded to obtain information of multiple channels, which facilitates the transmission of the complicated signal.

It should be noted that, in the foregoing embodiments, the target data being binary strings are taken as an example. It can be known that when the target data are decimal strings, they can correspond to different polarization angles respectively. For example, for the decimal strings, 0 corresponds to polarization angle 0°, 1 corresponds to polarization angle 10°, 2 corresponds to polarization angle 20°, . . . , 9 corresponds to polarization angle 90°; when the target data are hexadecimal strings, four pixel units can be used as a character representing unit. Each pixel unit corresponds to two polarization angles. It should be noted that, it is also possible to convert decimal character strings and hexadecimal strings into binary strings and then transmit them through the transmitting device, and the working principle thereof is substantially the same, which will not be described in detail herein. In order to facilitate receiving the polarized light beam emitted from the light-emitting display screen deflected according to the target deflection angle, the second aspect of the embodiments of the present disclosure provides an optical communication receiving device, which can solve the problem in the related art where the service life of the backlight is shorten and the quality of the screen display is adversely affected due to the optical communication of the display panel.

As the right side of FIG. 1 shows, the optical communication receiving device includes:

an optical signal receiving unit 21, configured to receive, through a polarizing device, a polarized light beam emitted from a light-emitting display screen being not deflected, to obtain a second image, and receive, through the polarizing device, a polarized light beam emitted from the light-emitting display screen being deflected according to a target deflection angle, to obtain a first image, wherein each of the second image and the first image includes at least one decoding region and corresponds to a respective encoding region; wherein the optical signal receiving unit may be a camera with a polarizing device; a preset angle of a transmission axis of the polarizing device is adjustable;

a decoding unit (not shown in FIG. 1), configured to parse the first image and the second image according to a presetting decoding rule, and obtain a code stream, wherein the decoding rule is related to a magnitude of a grayscale variation of an image.

It can be seen from the above that, the optical communication receiving device provided in the embodiments of the present disclosure may receive through a polarizing device the polarized light beam emitted from the non-deflected light-emitting display screen, to obtain the second image, and receives through the polarizing device the polarized light beam emitted from the light-emitting display screen being deflected according to the target deflection angle, to obtain the first image; and parses the first image and the second image and obtains a code stream according to a presetting decoding rule, instead of using the flicker of the backlight, which can effectively solve the problem in the related art where the service life of the backlight is shorten and the quality of the screen display is adversely affected due to the optical communication of the display panel, which is also harmful to human eyes.

Further, the polarizing device may be a polarizer. The specific arrangement form of the polarizer can be selected flexibly, which will not be particularly further defined herein.

The decoding unit includes: a grayscale-variation-image obtaining subunit, configured to obtain, according to the first image and the second image, a grayscale variation image of the first image relative to the second image, wherein each decoding region of the grayscale variation image has a grayscale variation value;

a grayscale threshold setting subunit, configured to set a grayscale threshold;

a code stream generation subunit, configured to obtain, according to the grayscale variation value of each decoding region of the grayscale variation image and the grayscale threshold, codes of all or part of the decoding regions of the grayscale variation image, and generate a code stream.

The code stream generation subunit includes: a decoding rule generation subunit, configured to decode the decoding region to be 1 when the grayscale variation value of the decoding region is greater than the grayscale threshold, and decode the decoding region to be 0 when the grayscale variation value of the decoding region is less than the grayscale threshold.

Optionally, a charge-coupled image sensor or a complementary metal oxide semiconductor image sensor is arranged in the camera, such a camera is more compatible with a mobile terminal and any other device, so that a smart mobile terminal can be used to achieve communication optical signal reception. Herein, the smart mobile terminal may be any terminal device including a mobile phone, a tablet computer, a personal digital assistant (PDA), a point of sales (Point of Sales, POS), etc.

Specifically, the decoding rule matches the encoding rule in the foregoing embodiments of the optical communication transmitting device and the preset angle of the transmission axis of the polarizing device.

Take the following for example: the encoding rule being that the encoding regions of the liquid crystal panel are sequentially encoded from left to right and from top to bottom, and the angle of the transmission axis of the polarizing device is consistent with the vibration direction of the light emitted from the light-emitting display screen, FIG. 4 is the first image collected by the optical signal receiving unit, including 4×4 pixels, and FIG. 4 is the first image obtained according to the encoding rule shown in FIG. 3.

FIG. 5A is a schematic diagram of a type of the second image provided by an embodiment of the present disclosure, and FIG. 5A is the second image formed through receiving through a polarizing device a polarized light beam emitted from a non-deflected light-emitting display screen.

The second image and the first image both include at least one decoding region and correspond to encoding regions.

FIG. 5B is the schematic diagram of the first image corresponding to the schematic diagram of the second image in FIG. 5A.

A grayscale variation image of the first image relative to the second image is obtained according to the first image and the second image, wherein each decoding region of the grayscale variation image has a grayscale variation value.

FIG. 5B shows the grayscale variation of each decoding region of the first image relative to each decoding region of the second image.

In FIG. 5B, the grayscale of the first decoding region in the first row is reduced by 80, and the grayscale of the second decoding region in the first row is reduced by 50.

When the preset angle of the transmission axis of the polarizing device is consistent with the vibration direction of the emitted light of the light-emitting display screen, and it simply assumes that the reducing of the grayscale is represented by 0 and the increasing of the grayscale is represented by 1, then the decoded image is as shown in FIG. 6, wherein the generated code stream is 0001001011100010.

By setting the angle of the transmission axis of the polarizing device to be adjustable, the receiving device is widely applicable. When different data needs to be received, only the angle of the transmission axis of the polarizing device needs to be adjusted, which is simple and convenient.

The third aspect of the embodiments of the present disclosure provides an optical communication system, which can solve the problem in the related art where the service life of the backlight is shorten and the quality of the screen display is adversely affected due to the optical communication of the display panels.

As shown in FIG. 1, the optical communication system includes: an optical communication transmitting device and an optical communication receiving device; the optical communication transmitting device is any optical communication transmitting device in the foregoing embodiments or combinations of embodiments, and the optical communication receiving device is any optical communication receiving device in the foregoing embodiments or combinations of embodiments.

It can be seen from the above that, in the optical communication system provided in the embodiments of the present disclosure, the emitting terminal is provided with a control circuit, and by arranging a liquid crystal panel on the light emission side of the light-emitting display screen, it generates a driving voltage that controls the liquid crystal molecules of the liquid crystal panel to be twisted according to a presetting encoding rule, the presetting encoding rule being related to a target deflection angle;

After the polarized light beam emitted from the light-emitting display screen passes through the liquid crystal panel driven by the driving voltage, it is deflected according to the target deflection angle and transmitted to the optical communication receiving device. The receiving terminal receives through a polarizing device the polarized light beam emitted from the non-deflected light-emitting display screen, to obtain the second image, and receive through the polarizing device the polarized light beam emitted from the light-emitting display screen deflected according to the target deflection angle, to obtain the first image, and parse the first image and the second image and obtain a code stream according to a presetting decoding rule. Based on this method, the transmission of the optical communication signal does not require the flicker of the backlight, which will not affect the service life of the backlight at all, and will not cause harm to human eyes due to the flicker. In addition, because the liquid crystal layer does not change the color and brightness of the light, but only changes the polarization angle of the polarized light beam emitted from the light-emitting display screen, the original color and brightness can be maintained, and it has multiple polarization directions, so as to ensure the display quality and at the same time obtain display light that is more similar to natural light, which has the effect of protecting eyes, and the entire optical communication transmitting device can realize eye-protecting display.

The fourth aspect of the embodiments of the present disclosure provides a method for implementing optical communication, which can solve the problem in the related art where the service life of the backlight is shorten and the quality of the screen display is adversely affected due to the optical communication of the display panel.

The method for implementation optical communication is applicable to a transmitting device, the transmitting device includes a light-emitting display screen, a liquid crystal panel, and a control circuit, the liquid crystal panel is located at a light emission side of the light-emitting display screen; and the method includes:
  generating, according to a presetting encoding rule, a driving voltage that controls liquid crystal molecules of the liquid crystal panel to be twisted, and the presetting encoding rule is related to a target deflection angle,
  wherein a polarized light beam emitted from the light-emitting display screen passes through the liquid crystal panel driven by the driving voltage, and then is deflected according to the target deflection angle, and then is transmitted to an optical communication receiving device.

As an optional embodiment, in the method, the liquid crystal panel includes at least one encoding region, and the encoding region corresponds to one or more pixels of the light-emitting display screen.

As an optional embodiment, the method further includes: independently driving the light-emitting display screen and the liquid crystal panel.

As an optional embodiment, in the method, polarization directions of the polarized light beams emitted respectively by one or more pixels of the light-emitting display screen are same, the one or more pixels of the light-emitting display screen correspond to the encoding region;
  when there are more than two encoding regions, the polarization directions of the polarized light beams emitted respectively by the one or more pixels of the light-emitting display screen corresponding to any one of the encoding regions are independent of the polarization directions of the polarized light beams emitted respectively by the one or more pixels of the light-emitting display screen corresponding to any other one of the encoding regions, and the control circuit is configured to control the driving voltages of the liquid crystals in the encoding regions.

The fifth aspect of the embodiments of the present disclosure provides a method for implementing optical communication, which can solve the problem in the related art where the service life of the backlight is shorten and the quality of the screen display is adversely affected due to the optical communication of the display panel.

The method for implementing optical communication, operable by an optical communication receiving device, includes:
  receiving, through a polarizing device, a polarized light beam emitted from a light-emitting display screen being not deflected, to obtain a second image, and receiving, through the polarizing device, a polarized light beam emitted from the light-emitting display screen being deflected according to a target deflection angle, to obtain a first image, wherein each of the second image and the first image includes at least one decoding region corresponding to a respective encoding region;
  parsing the first image and the second image according to a presetting decoding rule, and obtaining a code stream, and the decoding rule being related to a magnitude of a grayscale variation of an image.

As an optional embodiment, wherein parsing the first image and the second image according to the presetting decoding rule, and obtaining the code stream, and the decoding rule being related to the magnitude of the grayscale variation of the image, includes:
  obtaining, according to the first image and the second image, a grayscale variation image of the first image relative to the second image, wherein each decoding region of the grayscale variation image has a grayscale variation value;
  setting a grayscale threshold;
  obtaining, according to the grayscale variation value of each decoding region of the grayscale variation image and the grayscale threshold, codes of all or part of the decoding regions of the grayscale variation image, and generating a code stream.

As an optional embodiment, the decoding region is decoded to be 1 when the grayscale variation value of the decoding region is greater than the grayscale threshold, and the decoding region is decoded to be 0 when the grayscale variation value of the decoding region is less than the grayscale threshold.

As an optional embodiment, a transmission axis of the polarizing device is configured to be adjustable.

The methods in the above described embodiments correspond to the devices in the foregoing embodiments, and has the advantageous of the corresponding device, which will not be described in detail herein.

It should be noted that the methods in one or more embodiments of the present disclosure can be executed by a single device, such as a computer or a server. The methods in the present embodiments can also be applied in a distributed scenario, and implemented by multiple devices cooperating with each other. In the case of the distributed scenario, one of the multiple devices can only perform one or more steps in the methods of one or more embodiments of the present disclosure, and the multiple devices will interact with each other to implement the described method.

The foregoing describes specific embodiments of the present disclosure. Other embodiments are within the scope of the appended claims. In some cases, the actions or steps described in the claims may be performed in a different order than that in the embodiments and still achieve desired results. In addition, the processes depicted in the drawings do not necessarily require the specific order or sequential order as shown to achieve the desired results. In some implementations, multitasking processing and parallel processing are also possible or may be advantageous.

A person skilled in the art should understand that the discussion of any of the above embodiments is only exemplary, and is not intended to imply that the scope of the present disclosure (including the claims) is limited to these examples; under the teaching of the present disclosure, the technical features in the above embodiments or in different embodiments can also be combined, the steps can be implemented in any order, and there may be many other changes in different aspects of one or more embodiments of the present disclosure as described above, which are not included in the details for the sake of conciseness.

In addition, in order to simplify the description and discussion, and in order not to make one or more embodiments of the present disclosure difficult to understand, the accompanying drawings may or may not show the well-known power/ground connection to integrated circuit (IC) chips and other components. In addition, the device may be shown in the form of a block diagram in order to avoid making one or more embodiments of the present disclosure difficult to understand, and this also takes into account the fact that the details about the implementation of these block diagram devices are highly dependent on the platform which will implements one or more embodiments of the present disclosure (that is, these details should be fully within the understanding scope of those skilled in the art). In the case where specific details (for example, a circuit) are set forth to describe exemplary embodiments of the present disclosure, it is obvious to a person skilled in the art that it may be possible that without these specific details or with these specific details changed, one or more embodiments of the present disclosure may be implemented. Therefore, these descriptions should be considered illustrative rather than restrictive.

Although the present disclosure has been described in conjunction with specific embodiments of the present disclosure, many substitutions, modifications and variations of these embodiments will be obvious to a person skilled in the art based on the foregoing description. For example, other memory architectures (for example, dynamic random access memory (DRAM)) can be used in the discussed embodiments.

One or more embodiments of the present disclosure are intended to cover all such substitutions, modifications and variations that fall within the broad scope of the appended claims. Therefore, any omissions, modifications, equivalent substitutions, and improvements made within the spirit and principle of one or more embodiments of this specification should be included in the protection scope of the present disclosure.

What is claimed is:

1. An optical communication transmitting device, comprising: a light-emitting display screen, a liquid crystal panel, and a control circuit;

the liquid crystal panel is located at a light emission side of the light-emitting display screen;

the control circuit is configured to generate, according to a presetting encoding rule, a driving voltage that controls liquid crystal molecules of the liquid crystal panel to be twisted, and the presetting encoding rule is related to a target deflection angle, wherein a polarized light beam emitted from the light-emitting display screen passes through the liquid crystal panel driven by the driving voltage, and then is deflected according to the target deflection angle, and then is transmitted to an optical communication receiving device, wherein the liquid crystal panel comprises at least one encoding region, and the encoding region corresponds to one or more pixels of the light-emitting display screen, wherein polarization directions of the polarized light beams emitted respectively by one or more pixels of the light-emitting display screen are same, the one or more pixels of the light-emitting display screen correspond to the encoding region;

when there are more than two encoding regions, the polarization directions of the polarized light beams emitted respectively by the one or more pixels of the light-emitting display screen corresponding to any one of the encoding regions are independent of the polarization directions of the polarized light beams emitted respectively by the one or more pixels of the light-emitting display screen corresponding to any other one of the encoding regions, and the control circuit is configured to control the driving voltages of the liquid crystals in the encoding regions.

2. The optical communication transmitting device according to claim 1, wherein the control circuit is further configured to update the encoding rule according to a screen refresh period of the light-emitting display screen.

3. The optical communication transmitting device according to claim 1, wherein the light-emitting display screen and the liquid crystal panel are driven independently.

4. An optical communication receiving device, comprising:

an optical signal receiving unit, configured to receive, through a polarizing device, a polarized light beam emitted from a light-emitting display screen being not deflected, to obtain a second image, and receive, through the polarizing device, a polarized light beam emitted from the light-emitting display screen being deflected according to a target deflection angle, to obtain a first image, wherein each of the second image and the first image comprises at least one decoding region corresponding to a respective encoding region;

a decoding unit, configured to parse the first image and the second image according to a presetting decoding rule, and obtain a code stream, wherein the decoding rule is related to a magnitude of a grayscale variation of an image.

5. The optical communication receiving device according to claim 4, wherein the decoding unit comprises:

a grayscale-variation-image obtaining subunit, configured to obtain, according to the first image and the second image, a grayscale variation image of the first image relative to the second image, wherein each decoding region of the grayscale variation image has a grayscale variation value;

a grayscale threshold setting subunit, configured to set a grayscale threshold;

a code stream generation subunit, configured to obtain, according to the grayscale variation value of each decoding region of the grayscale variation image and the grayscale threshold, codes of all or part of the decoding regions of the grayscale variation image, and generate a code stream.

6. The optical communication receiving device according to claim 5, wherein the code stream generation subunit comprises:
a decoding rule generation subunit, configured to decode the decoding region to be 1 when the grayscale variation value of the decoding region is greater than the grayscale threshold, and decode the decoding region to be 0 when the grayscale variation value of the decoding region is less than the grayscale threshold.

7. The optical communication receiving device according to claim 4, wherein a transmission axis of the polarizing device is configured to be adjustable.

8. An optical communication system, comprising:
an optical communication transmitting device; and
an optical communication receiving device according to claim 4,
wherein the optical communication transmitting device comprises a light-emitting display screen, a liquid crystal panel, and a control circuit;
the liquid crystal panel is located at a light emission side of the light-emitting display screen;
the control circuit is configured to generate, according to a presetting encoding rule, a driving voltage that controls liquid crystal molecules of the liquid crystal panel to be twisted, and the presetting encoding rule is related to a target deflection angle,
wherein a polarized light beam emitted from the light-emitting display screen passes through the liquid crystal panel driven by the driving voltage, and then is deflected according to the target deflection angle, and then is transmitted to an optical communication receiving device.

9. The optical communication system according to claim 8, wherein the liquid crystal panel comprises at least one encoding region, and the encoding region corresponds to one or more pixels of the light-emitting display screen.

10. A method for implementing optical communication, operable by the optical communication receiving device according to claim 6, comprising:
receiving, through a polarizing device, a polarized light beam emitted from a light-emitting display screen being not deflected, to obtain a second image, and receiving, through the polarizing device, a polarized light beam emitted from the light-emitting display screen being deflected according to a target deflection angle, to obtain a first image, wherein each of the second image and the first image comprises at least one decoding region corresponding to a respective encoding region;
parsing the first image and the second image according to a presetting decoding rule, and obtaining a code stream, and the decoding rule being related to a magnitude of a grayscale variation of an image.

11. The method according to claim 10, wherein parsing the first image and the second image according to the presetting decoding rule, and obtaining the code stream, and the decoding rule being related to the magnitude of the grayscale variation of the image, comprises:

obtaining, according to the first image and the second image, a grayscale variation image of the first image relative to the second image, wherein each decoding region of the grayscale variation image has a grayscale variation value;
setting a grayscale threshold;
obtaining, according to the grayscale variation value of each decoding region of the grayscale variation image and the grayscale threshold, codes of all or part of the decoding regions of the grayscale variation image, and generating a code stream.

12. The method according to claim 11, wherein the decoding region is decoded to be 1 when the grayscale variation value of the decoding region is greater than the grayscale threshold, and the decoding region is decoded to be 0 when the grayscale variation value of the decoding region is less than the grayscale threshold.

13. The method according to claim 10, wherein a transmission axis of the polarizing device is configured to be adjustable.

14. A method for implementing optical communication, wherein the method is operable by an optical communication transmitting device comprising a light-emitting display screen, a liquid crystal panel, and a control circuit; the liquid crystal panel is located at a light emission side of the light-emitting display screen; and the method comprises:
generating, according to a presetting encoding rule, a driving voltage that controls liquid crystal molecules of the liquid crystal panel to be twisted, and the presetting encoding rule is related to a target deflection angle,
wherein a polarized light beam emitted from the light-emitting display screen passes through the liquid crystal panel driven by the driving voltage, and then is deflected according to the target deflection angle, and then is transmitted to an optical communication receiving device,
wherein the liquid crystal panel comprises at least one encoding region, and the encoding region corresponds to one or more pixels of the light-emitting display screen,
wherein polarization directions of the polarized light beams emitted respectively by one or more pixels of the light-emitting display screen are same, the one or more pixels of the light-emitting display screen correspond to the encoding region;
when there are more than two encoding regions, the polarization directions of the polarized light beams emitted respectively by the one or more pixels of the light-emitting display screen corresponding to any one of the encoding regions are independent of the polarization directions of the polarized light beams emitted respectively by the one or more pixels of the light-emitting display screen corresponding to any other one of the encoding regions, and the control circuit is configured to control the driving voltages of the liquid crystals in the encoding regions.

15. The method according to claim 14, further comprising: updating the encoding rule according to a screen refresh period of the light-emitting display screen.

16. The method according to claim 14, further comprising: independently driving the light-emitting display screen and the liquid crystal panel.

* * * * *